(12) United States Patent
Kaji et al.

(10) Patent No.: US 6,269,304 B1
(45) Date of Patent: Jul. 31, 2001

(54) NAVIGATION SYSTEM AND METHOD AND STORAGE MEDIUM IN WHICH NAVIGATION PROGRAMS ARE STORED

(75) Inventors: Takanori Kaji; Hiroyoshi Masuda, both of Okazaki-chi (JP)

(73) Assignee: Aisin AW Co., LTD, Anjo (JP)

( * ) Notice: Subject to any disclaimer, the term of this patent is extended or adjusted under 35 U.S.C. 154(b) by 0 days.

(21) Appl. No.: 09/516,764

(22) Filed: Mar. 1, 2000

(30) Foreign Application Priority Data

Mar. 1, 1999 (JP) .................................................. 11-052524

(51) Int. Cl.[7] .............................. G06G 7/78; G01C 21/00
(52) U.S. Cl. ......................... 701/209; 701/223; 701/211; 701/208; 701/207; 342/70
(58) Field of Search .................................... 701/209, 207, 701/208, 211, 223; 342/70

(56) References Cited

U.S. PATENT DOCUMENTS

| | | | |
|---|---|---|---|
| 5,684,696 | * 11/1997 | Rao et al. ............................... | 701/25 |
| 5,902,350 | * 5/1999 | Tamai et al. ........................... | 701/211 |
| 6,055,467 | * 4/2000 | Mehring et al. ....................... | 701/23 |
| 6,061,628 | * 5/2000 | Hayashi et al. ....................... | 701/208 |
| 6,076,040 | * 6/2000 | Akutsu ................................... | 701/207 |
| 6,076,041 | * 6/2000 | Watanabe ............................... | 701/211 |
| 6,107,939 | * 8/2000 | Sorden ................................... | 340/901 |
| 6,115,652 | * 9/2000 | Sato et al. .............................. | 701/28 |
| 6,134,501 | * 10/2000 | Oumi ..................................... | 701/209 |
| 6,138,062 | * 10/2000 | Usami ................................... | 701/23 |

FOREIGN PATENT DOCUMENTS

| | | |
|---|---|---|
| S62-93617A | 4/1987 | (JP) . |
| H5-92636A | 12/1993 | (JP) . |

\* cited by examiner

Primary Examiner—William A. Cuchlinski, Jr.
Assistant Examiner—Olga Hernandez
(74) Attorney, Agent, or Firm—Oliff & Berridge, PLC

(57) ABSTRACT

The invention provides a driver with notice of a certain traffic lane change on a road having many traffic lanes even if passing intersections exists within a predetermined distance before a guide intersection. Specifically, the invention concerns a vehicle navigation system for performing a route search on the basis of the input of a point, such as a destination and further performing route guidance along the searched route, which includes an information memory device for storing traffic lane information at intersections, a display for displaying the traffic lane information and a display controller for displaying traffic lane information at intersections on the display on the basis of the traffic lane data stored on the display. The display controller determines whether a passing intersection exists within a predetermined distance before the guidance intersection and controls so as to display lane information of the passing intersections and guidance intersection when the passing intersections exists.

21 Claims, 16 Drawing Sheets

GUIDANCE ROAD DATA

| NUMBER (n) OF ROADS | |
|---|---|
| 1 | ROAD NUMBER |
| | LENGTH |
| | ROAD COORDINATE DATA |
| | SHAPE DATA ADDRESS/SIZE |
| | GUIDANCE DATA ADDRESS/SIZE |
| ⋮ | ⋮ |
| n | |

FIG. 2(A)

SHAPE DATA

| NUMBER OF NODES (M) | |
|---|---|
| 1 | EAST LONGITUDE |
| | NORTH LATITUDE |
| ⋮ | ⋮ |
| m | |

FIG. 2(B)

GUIDANCE DATA

| NAME OF INTERSECTION |
|---|
| CAUTION POINT DATA |
| ROAD NAME DATA |
| ROAD NAME VOICE DATA ADDRESS/SIZE |
| DESTINATION DATA ADDRESS/SIZE |

FIG. 2(C)

DESTINATION DATA

| NUMBER (k) OF DESTINATIONS | |
|---|---|
| 1 | DESTINATION ROAD NUMBER |
| | DESTINATION NAME |
| | DESTINATION NAME VOICE DATA ADDRESS/SIZE |
| | DESTINATION DIRECTION DATA |
| | TRAVEL GUIDANCE DATA |
| ⋮ | ⋮ |
| k | |

FIG. 2(D)

DESTINATION DIRECTION DATA

-1 : INVALID
0 : NOT REQUIRED
1 : STRAIGHT AHEAD
2 : RIGHTWARD
3 : DIAGONALLY RIGHTWARD
4 : RIGHT BACKWARD
5 : LEFTWARD
6 : DIAGONALLY LEFTWARD
7 : LEFT BACKWARD

FIG. 2(E)

| ROAD NUMBER (1) | | |
|---|---|---|
| NUMBER OF ACCESS LANES = 3 | | |
| NUMBER OF ADDED LANES AMONG THE ACCESS LANES = 1 | | |

| ACCESS ROAD NUMBER | DEPARTURE ROAD NUMBER | TRAVEL LANE | | |
|---|---|---|---|---|
| ① | ② | YES | NO | NO |
| ① | ③ | YES | YES | NO |
| ① | ④ | NO | NO | YES |

| ROAD NUMBER (2) | | |
|---|---|---|
| NUMBER OF ACCESS LANES = 2 | | |
| NUMBER OF ADDED LANES AMONG THE ACCESS LANES = 0 | | |

| ACCESS ROAD NUMBER | DEPARTURE ROAD NUMBER | TRAVEL LANE | |
|---|---|---|---|
| ② | ⑤ | YES | YES |
| ② | ⑥ | NO | YES |
| ② | ⑦ | YES | NO |

| ROAD NUMBER (3) | | |
|---|---|---|
| NUMBER OF ACCESS LANES = 3 | | |
| NUMBER OF ADDED LANES AMONG THE ACCESS LANES = 1 | | |

| ACCESS ROAD NUMBER | DEPARTURE ROAD NUMBER | TRAVEL LANE |
|---|---|---|
| ⋮ | ⋮ | ⋮ |

FIG. 3

NAVIGATION SYSTEM AND METHOD AND STORAGE MEDIUM IN WHICH NAVIGATION PROGRAMS ARE STORED

BACKGROUND OF THE INVENTION

1. Field of Invention

This invention relates to a navigation system that searches a route according to an input of a point as a destination and executes route guidance along the searched route.

2. Description of Related Art

Generally, there are navigation systems that display arrows indicating "straight", "turn right" and "turn left", etc., on a display screen, and perform guidance by audibly outputting the contents thereof when a vehicle comes close to an intersection, etc., during the route. If a road has a plurality of lanes, the driver needs to change lanes in advance before making a right or a left turn at an intersection, so the arrows draw his attention prior to the intersection so that he can change lanes.

In Japanese Laid Open Patent Application No. S62-93617A, direction arrows for respective lanes are displayed as lane information (the same one as applied to the actual road) when the vehicle only reaches a predetermined distance before the guidance intersection. Further, in the Japanese Patent Laid Open Patent Application No. H5-92636A, arrows indicating a right or a left turn are displayed, the phrase "Travel on right lane" or "Travel on left lane" is displayed, and "come near to the right" or "come near to the left" is audibly output when the vehicle reaches a predetermined distance before an intersection at which the vehicle must turn.

However, in a method according to the Japanese Laid Open Patent Application No. S62-93617A, since the same display method is always applied even to the passing intersection and guidance intersection, it holds a problem that the driver can not distinguish between lane display guidance of the passing intersection and lane display guidance of the guidance intersection which is more important than the passing intersection. In either of the above methods, since lane information is displayed when the vehicle reaches a predetermined distance, for example 200 m, before the guidance intersection, if the passing intersection exists on a road that includes many traffic lanes at the guidance intersection, it brings a result that the vehicle changes lanes for a left or right turn only lane before the passing intersection. It further brings a result that the driver feels the stress due to the uneasiness about the lane change if the number of lanes increases or decreases between the vehicle present position, the passing intersection and the guidance intersection.

SUMMARY OF THE INVENTION

The invention provides a navigation system and storage medium in which a lane change can be made correctly even if passing intersections exist within a predetermined distance prior to the guidance intersection on a road with many traffic lanes.

In particular, the navigation system searches a route according to the input of a point, such as a destination, and performs route guidance along the searched route, and may include an information memory device for storing lane information data of the intersections, a display for displaying the lane information, and a display controller for displaying lane information of the intersection on the display on the basis of lane information data stored in the information memory device. The display controller determines whether the passing intersections exist within a predetermined distance before the guidance intersection, such that if passing intersections exist, the display controller controls the lane information of the passing intersection and guidance intersection being displayed.

The invention may also include a present position detector for detecting information regarding the vehicle's present position. The display controller determines whether passing intersections exist from the vehicle present position to the guidance intersection when the vehicle present position comes close to the predetermined distance from the guidance intersection.

The display controller controls the deletion of lane information of the passing intersection when the vehicle present position passes the passing intersection.

The lane information may include a number of lanes of the access road and a number of lanes of the departure road at the intersection and travel lane information of each lane. The display controller controls such that travel direction arrows are displayed only on the lane which the vehicle can travel.

The display controller may determine whether lane information is displayed on the basis of the priority given to the guidance intersections when guidance display sections for the plurality of the guidance intersections fall into the same section.

The invention may also include a drawing unit for drawing a bird's eye view by changing a viewpoint thereof The display controller controls so that a bird's eye view is changed every time the vehicle passes a passing intersection.

The present invention also may include a storage medium in which programs of the navigation system searches a route according to the input of a point, such as a destination, and performs route guidance along the searched route. The programs controls so that lane information of the intersection stored in the information memory device is read out, determines whether the passing intersections exist within a predetermined distance before the guidance intersection, and displays the stored lane information of the passing intersection and the guidance intersection if the passing intersection exists.

According to the invention, the passing intersection and the guidance intersection is displayed if the passing intersections exists within the predetermined distance before the guidance intersection, and lane information of the passing intersection is deleted when the vehicle passes the passing intersection. Therefore, the driver is able to certainly keep up with lane changes even if the passing intersections exist on a road with many traffic lanes when approaching to the guidance intersection. At the same time, the driver is able to understand a number of intersections which the vehicle is to pass and also the sense of distance to the guidance intersection in real time since only the necessary information is displayed to him. Thus, the vehicle is capable of traveling correctly without feeling the stress. Further, by updating the bird's eye view as it changes every time the vehicle passes a passing intersection, the guidance intersection can be distinguished more easily.

BRIEF DESCRIPTION OF THE DRAWINGS

FIGS. 2(A)–2(E) are block diagrams showing examples of main data file structure stored on the information memory device of FIG. 1;

FIG. 3 is a block diagram showing an example of data structure regarding to lane information according to the invention;

DETAILED DESCRIPTION OF PREFERRED EMBODIMENTS

Figure 1:
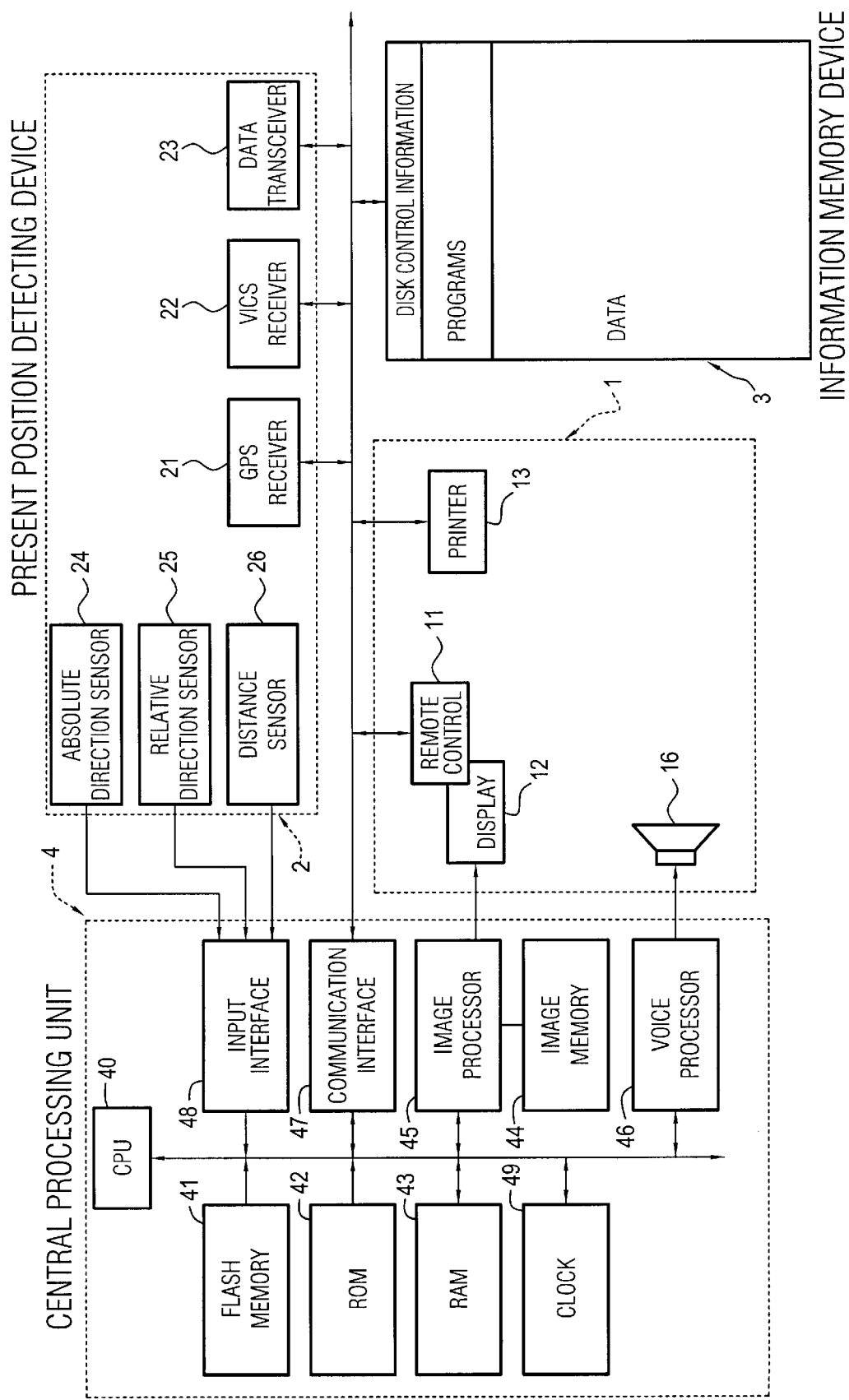
FIG. 1 is a diagram showing one example of composition of a navigation system according to the invention.

The followings are embodiments of the invention, which will be described with reference to the drawings. FIG. 1 is a diagram showing an example of navigation system applied to the present invention, which includes an input/output device 1 for inputting and outputting information regarding route guidance, a present position detector 2 for detecting a vehicle present position, an information memory device 3 in which navigation data necessary for route calculation and display guidance data necessary for guidance etc. are stored, and a central processing unit 4 for executing the entire system control with the execution of a route search processing or a display guidance processing necessary for route guidance.

The input/output device 1 is equipped with functions to input a destination, to instruct the central processing unit 4 to execute the navigation processing at driver's own will, so as to be capable of outputting guidance information audibly or by display when required by the driver, and to print out the processed data, etc. The input section has a remote control 11 for calling a menu screen, inputting a destination in the form of a telephone number or coordinates on a map, etc., and for requesting route guidance, which is provided as a way for implementing these functions. Further, the output section includes a display 12 for automatically displaying route guidance on a screen as corresponding to the driver's request, a printer 13 for printing out data processed by the central processing unit 4 and data stored on the information memory device 3, and a speaker 16 for audibly outputting route guidance. The display 12 includes a color CRT or liquid-crystal display device, which outputs all screens necessary for navigation, such as a route setting screen, a screen of interval view and a screen of intersections, etc., as a color display.

Present position detector detects or receives information on the vehicle present position, which is provided with an absolute directional sensor 24, for example, as being completed of a geomagnetic sensor, a relative directional sensor 25 as being composed of a steering sensor, a gyro sensor etc., a distance sensor 26 for detecting travel distance from a number of revolution of a wheel, a GPS receiver 21 utilizing a global positioning system (GPS), and a communication device. The communication device includes a VICS (Vehicle Information & Communication System) receiver 22 and a data transceiver 23. Further, the data transceiver 23 includes a cellular telephone or personal computer, for example, which exchanges information required for navigation between the traffic information center (ATIS, for example) when required by the driver.

The information memory device 3 is an external storage device in which programs and data for navigation are stored, for example, an optical storage medium, such as a CD-ROM., a DVD-ROM etc., or a magnetic storage medium, such as a floppy disc, a MO, etc., or a electrical storage medium, such as an IC card etc. Stored therein, are programs for executing route processing, such as route search etc., programs for executing a guidance display control necessary for route guidance, programs for executing route pro output control necessary for voice guidance and necessary data thereof, and further display information data necessary for route guidance and map display. The programs include an application section and an OS section, wherein the application includes a map drawing section, a route searching section, a route guidance section, a present position detecting section, a guidance control display section, etc., and executes a signal output processing for navigation. Further, the data includes map data necessary for route guidance, intersection data, node data, road data, photograph data, register point data, destination data, guidance road data, detailed destination data, destination reading data, telephone number data, address data, and other data files, wherein all the data necessary for the navigation system is stored.

The central processing unit 4 includes a CPU 40 for performing various calculation processing, a flash memory 41, that can be rewritten to store important information (for example, a program to execute route search and route guidance, data to set a condition, data of various parameters, etc.) in a nonvolatile manner (a nonvolatile memory which can be written), namely EEPROM for Electrically Erasable and Programmable ROM; a ROM 42, such as a nonvolatile memory, to store programs for executing program check of the flash memory 41, a program for executing update processing (a program reading device), a program for executing a data check of the flash memory 41 and the RAM 43, and programs for controlling the manually rewriting of information stored in the flash memory 41; a RAM 43, such as a volatile memory with free-reading and free-writing wherein individually memorized information, such as a memory point to register information of a given point by driver's operation, information of frequency accumulated by a learning function, and error modified information by various detective devices, are temporarily (in a volatile manner) stored and the stored information can be maintained even if ACC is switched off, using SRAM (Static RAM) which can electrically maintain the temporarily stored information; and an image memory 44 which stores image data used for the screen display to a display. The central processing unit 4 further comprises an image processor 45 for extracting image data from the image memory 44 on the basis of a display-output control signal received from the CPU 40 and executing image processing prior to output the data to the display; an audio processor 46 in which an analog signal, as converted by combining audio, phrases, single sentences and sounds etc. read out of the information memory device 3 on the basis of the display-output control signal, is output to a speaker 16; a communication interface 47 for performing an exchange of input/output data by communications; a sensor-input interface 48 for accepting a sensor signal received from the present position detector 2; and a clock 49 for entering a date and time into internal dialog information. The central processing unit 4, accepts data obtained by each sensor of that data and temporarily writes the data into the RAM 43.

FIGS. 2(A)–4 show examples of main data file structures stored in the information memory device 3 according to the invention shown in FIG. 1. FIG. 2(A) shows a file of guidance road data in which necessary data for calculating a route using the route calculation device, which includes a road number n, length, road coordinate data, shape data address/size, guidance data address/size for each of the road number. The road number is set independently of the directions (approaching path, return path) with respect to each road between adjacent branch points. The road coordinate data is road guidance assisting information data, which is the data indicative of elevated/subway road and lane information. The shape data, as shown in FIG. 2(B), has coordinate data composed of east longitude and north latitude with respect to each of role number in when divided by a plurality of nodes of each road. The guidance data, as shown in FIG. 2(C), includes an intersection (or branch point) name, caution point data, road name data, intersection (junction) name, caution data, road name data, the address and size of road name voice data, the address and size of destination data. The caution data is the data to make the driver pay attention at a crossing without the branch point or a tunnel etc. The road name data is the data showing information of the road such as a highway, a national road, a local road and each kind of the other roads. The destination direction data as shown in FIG. 2(D), includes a destination road number, a destination name, the address and size of the destination name voice data, a destination direction data and a travel guidance data. The destination direction data, as shown in FIG. 2(E), is the data showing direction information, such as invalid (destination direction is not used), not required (guidance is not performed), straight, rightward, diagonally rightward and so on.

Figure 4:
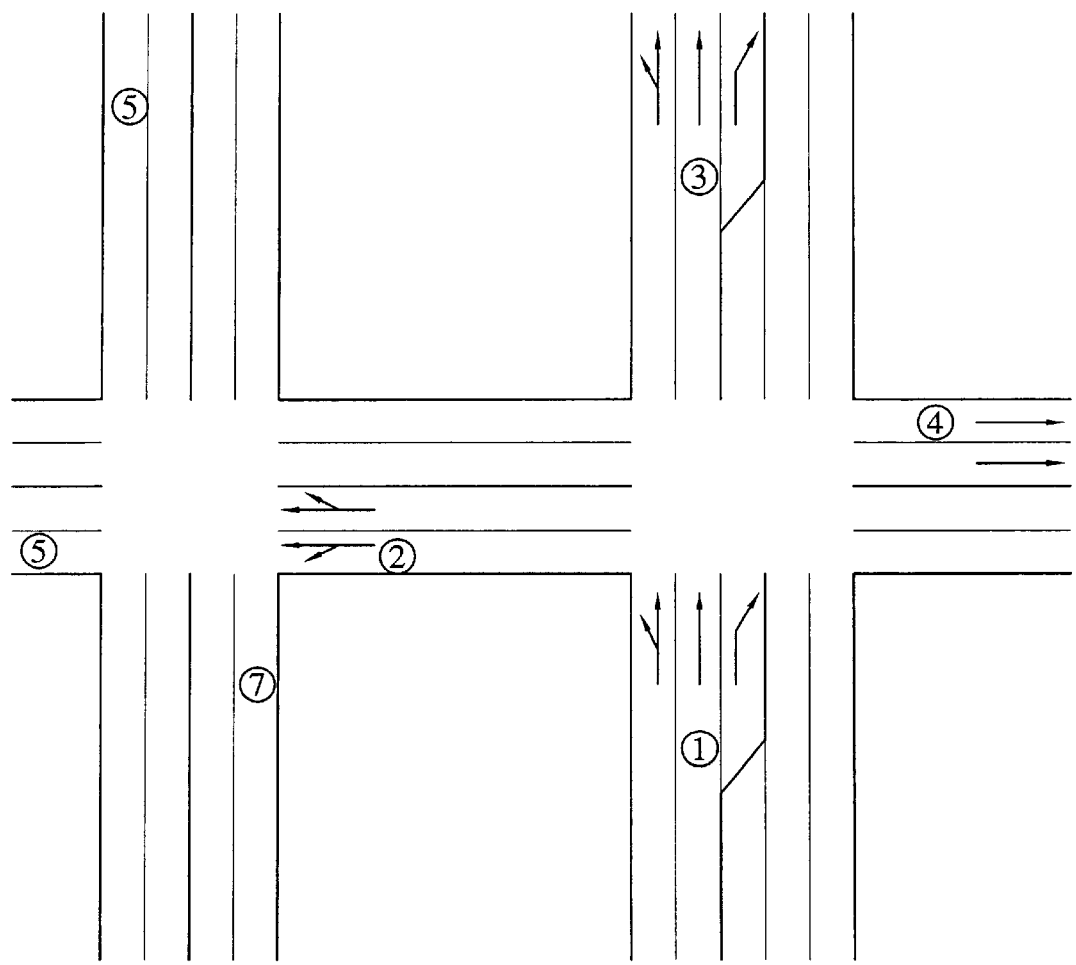
FIG. 4 is a diagram explaining a data structure of FIG. 3.

FIG. 3 shows an example of data structure of traffic lane information related to the invention among road coordinate data of FIG. 2(A). FIG. 4 is a diagram describing the data structure of FIG. 3. For example, in a road form shown in FIG. 4, road numbers 1–7 are given to each road for traveling outbound and returning, and road number 1 contains 3 traffic lanes (namely, 3 lanes entering into the intersection), wherein the left lane is for "left turn and straight on", the center lane is for "straight on" and the right lane is for "right turn only". If considering that a vehicle makes a left turn from the road number 1 entering onto the road number 2 (the road number 1 entering into the intersection m the road number 2 departing from the intersection), the first lane from left is to be a guidance lane for the road number 1.

As shown in FIG. 3, the data structure for lane information having such a road form includes, a road number, a number of lanes which a road entering into the intersection contains, namely access lane, a number of added lanes among the access lane, a combination of numbers between a road entering into the intersection, namely access road and a road departing from the intersection, namely a departure road, and travel lane information which the vehicle can travel. The number of the added lanes is a number of lanes added in the middle of a road such as a left turn only lane or a right turn only lane before an intersection, and lane whether the vehicle can travel from an access road number to an departure road number is stored as travel lane information on the basis of each access lane.

For example, if the vehicle make a left turn from the road number 1 to the road number 2, only the first lane from the left is capable of allowing a left turn among the access lanes on the road number 1 and the center lane and the first lane from the right are not capable of allowing a left turn. Therefore, travel lane information is stored to be in the order of "Yes", "No" and "No" from the left side. In the same way, if the vehicle travels from the road number 1 straight to the road number 3, among the access lanes on the road number 1, the first lane from the left and center lane are capable of giving the straight direction, on the other hand the first lane from the right is a right turn only lane which is not capable of giving the straight direction. Therefore, travel lane information is stored to be in order of "Yes", "Yes" and "No" from the left side.

As taking such a data structure of lane information, for example, if a route entering from the road number 1 onto the road number 2 as making a left is searched, only a left turn arrow on the first lane from the left can be displayed (the details are described later).

Figure 5:
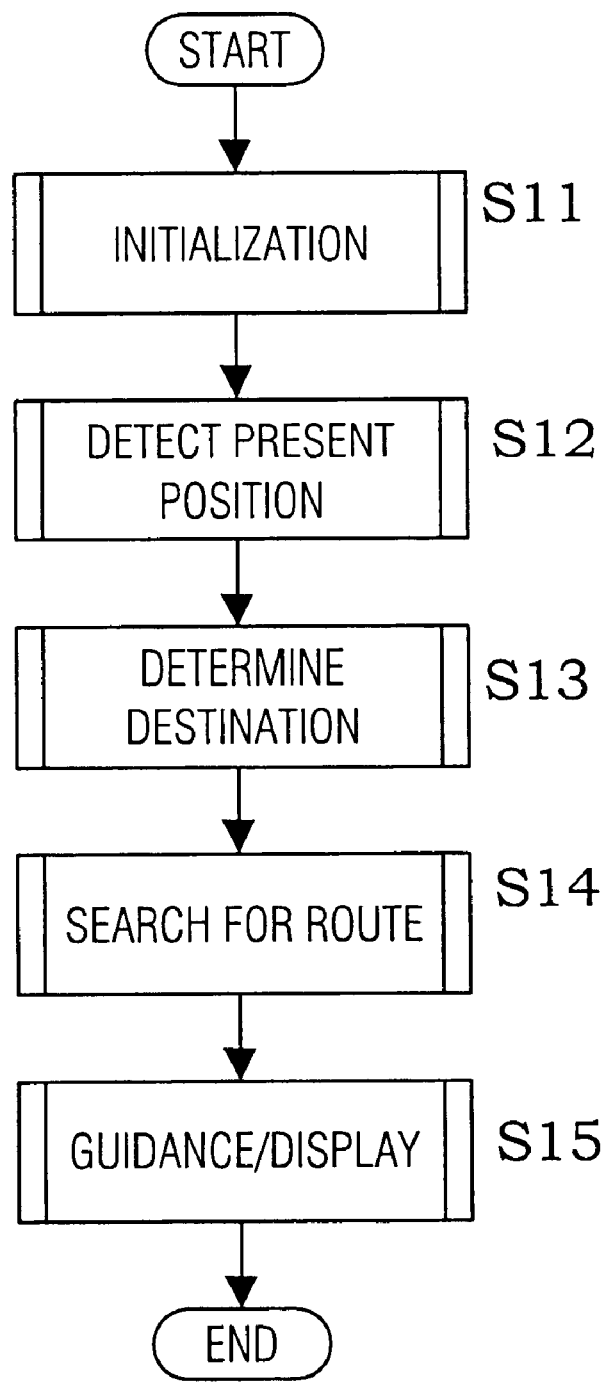
FIG. 5 is a flowchart explaining the entire processing of the navigation system of FIG. 1.

FIG. 5 is a flowchart for explaining the entire navigation system process. An outline of the processing concerns the navigation system executing a start up of the system, a point input, a route search, and route guidance by the CPU 40. First of all, the navigation system starts up as a navigation program read from a CD-ROM after executing an initialization step and is then stored on a flash memory 41 (Step S11). Next, the present position of the vehicle is obtained using the present position detecting device 2, and the name of the present position is displayed simultaneously while displaying a nearby area map with such the present position being placed at its center (step S12). Then, a destination is determined by use of telephone number, address, facility name, registered point etc. (step S13), and a route from the present position to the destination is searched (step 14). As the route is determined, the visual display and audible route guidance are output while the present position is tracked using the present position detecting device 2 (step S15).

Figure 6A:
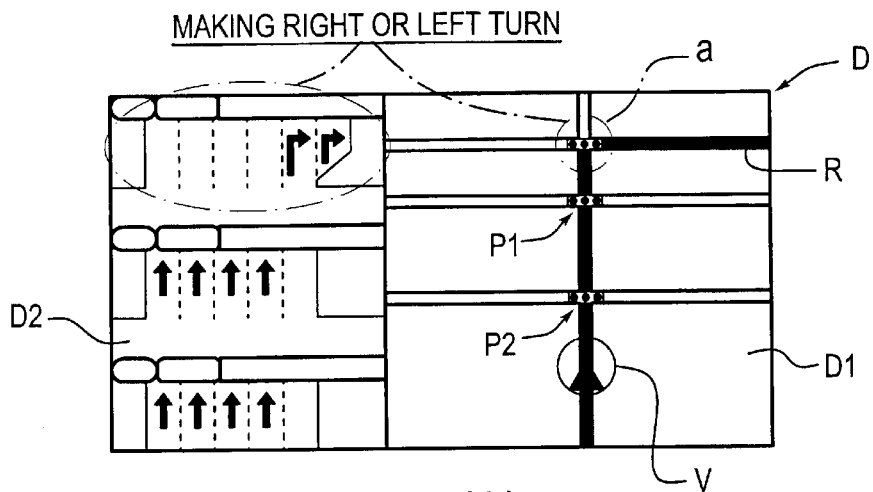
FIGS. 6(A)–6(C) are diagrams showing display examples of guidance screen at guidance intersections according to the invention.
Figure 6B:
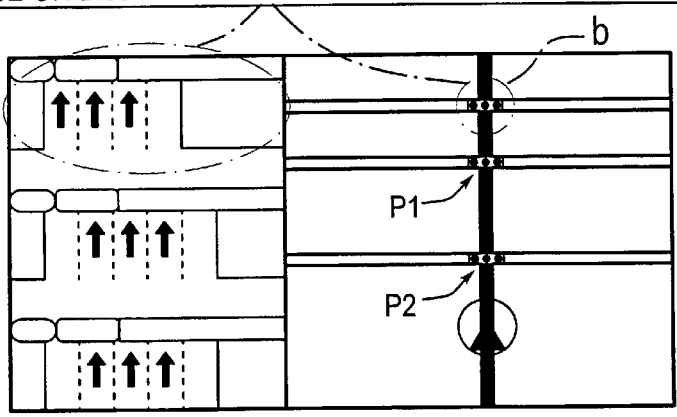
Figure 6C:
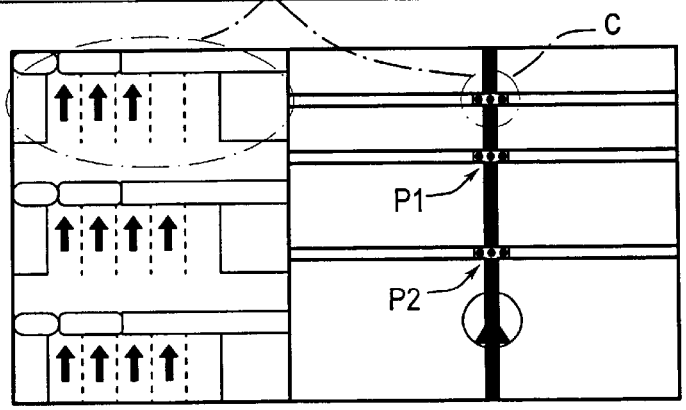

An embodiment according to the invention is described by applying the guidance/display processing S15 from the above navigation processing. FIGS. 6(A)–6(C) contain three diagrams showing various display examples of a guidance screen at guidance intersections according to the present invention. A guidance screen D is divided into 2 sections, a information screen D1 showing a guidance route is displayed on the right side window, and a lane information screen D2 is displayed on the left side window. Guidance intersections (a), (b) or (c), passing intersections P1 and P2, and a vehicle position V are displayed with a guidance route R accentuated on each information screen D1. Further, information on each lane before the guidance intersections (a), (b) or (c) and the passing intersections P1 and P2 are displayed on each lane information screen D2.

FIG. 6(A) is a diagram showing a guidance example if a guidance route involves making a right or a left turn at the intersection (a) (including a right or a left turn to the diagonally rightward or leftward direction). Passing intersections P1 and P2 are located before the predetermined distance to the intersection (a), wherein the first lane from the right at the passing intersections P1 and P2 indicates a right turn only lane, lane information before the respective points P1 and P2 is displayed to be a straight direction arrow on each 4 lanes from the left among 5 lanes in order to let a vehicle travel along the route and also to prevent the vehicle from entering into the right turn only lane at the passing intersections P1 and P2. Lane information before the guidance intersection (a) is displayed to be a right turn arrow on each of 2 lanes from the right among the 6 lanes. These travel direction arrows do not always correspond to arrows given to the actual roads, which indicate arrows corresponding to lanes in which the vehicle can travel along the detected route. For example, even if the second lane from the right is searched as a route that is capable of giving a straight direction and making a right turn at the passing intersection P1, since the searched route is extending to the straight direction at the P1, only the straight direction arrows are displayed.

FIG. 6(B) is a diagram showing a guidance example if a number of traffic lanes are decreased between the passing intersection P1 and the guidance intersection (b) when traveling in a straight direction at the guidance intersection (b), wherein lane information before the passing intersections P1 and P2 is to display a straight direction arrow on 3 lanes located in the middle among 5 lanes, and lane information before the guidance intersection (b) is to display straight direction arrow on 3 lanes from the left among 4 lanes, to prevent the vehicle from entering into the right lane which is a right turn only lane at the guidance intersection (b). Further, this is applicable to the case when the number of lanes is increased.

FIG. 6(C) is a diagram showing a guidance example if a number of guidance lanes is decreased between the passing intersection P1 and the guidance intersection (c) in case of having 2 right turn only lanes at the guidance intersection (c), wherein lane information before the passing intersections P1 and P2 is to display a straight direction arrow on the left side 4 lanes out of 5 lanes and lane information before the guidance intersection (c) is to display a straight direction arrow on the left side 3 lanes out of 5 lanes in order to prevent the vehicle from entering into 2 right turn only lanes on the right side. Further, this is applicable to the case when the number of guidance lanes is increased.

Figure 7:
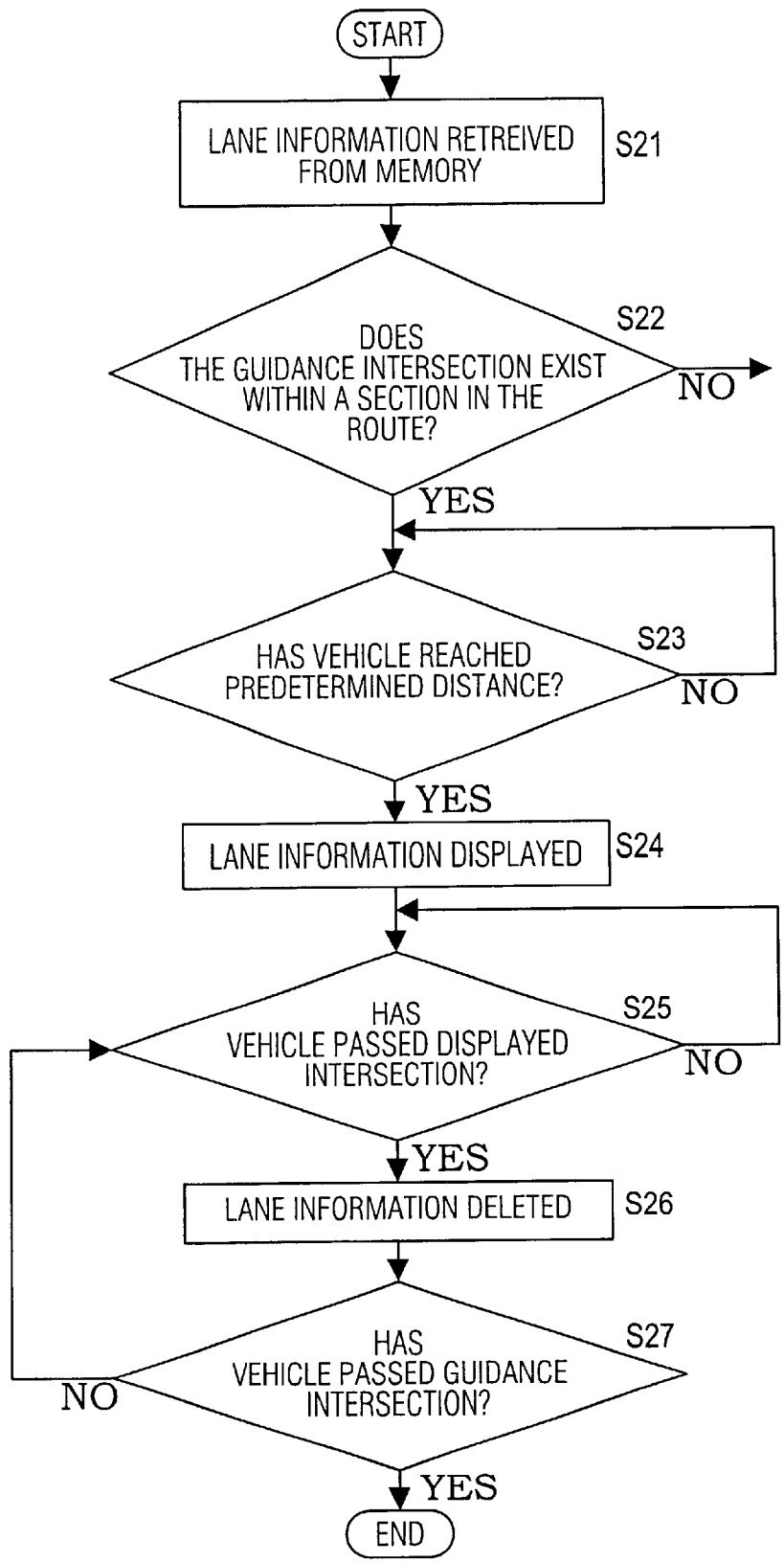
FIG. 7 is a flowchart showing a display processing of a plurality of lane information according to the first embodiment of display controller of the invention.

FIG. 7 is a flowchart showing the display processing of a plurality of lane information that enables guidance of the above lane information to be displayed by using the first embodiment of display controller according to the present invention. First of all, the entire lane information existing within, for example, 5 km from the vehicle position on the route, is stored on a memory 43 (step S21), then it is determined whether the guidance intersection (a), (b) or (c) explained in FIGS. 6(A)–6(C), exists within a section on the route (step S22). If not, the process moves on to other processing. If yes, it is then determined whether the vehicle has reached the predetermined distance, for example, 700 m before the guidance intersection (a), (b) or (c) on the route (step S23). If the vehicle reaches 700 m before the guidance intersection, the maximum of 3 lane information including the guidance intersection thereof, are displayed in order of the passing points P1 and P2 close to the guidance intersection (a), (b) or (c), as shown in FIGS. 6(A)–6(C) (step S24). Then, it is determined whether the vehicle passes the intersection which lane information thereof, is currently being displayed (step S25). Lane information of the intersection which the vehicle passed is then deleted (step S26). It is then determined whether the vehicle has passed the guidance intersection (step S27). If the vehicle has not pass the guidance intersection, the processing returns to step S25, a processing to delete lane information of the passing intersection in which the vehicle passes is executed, and when the vehicle passes the guidance intersection, the processing is completed.

Figure 8A:
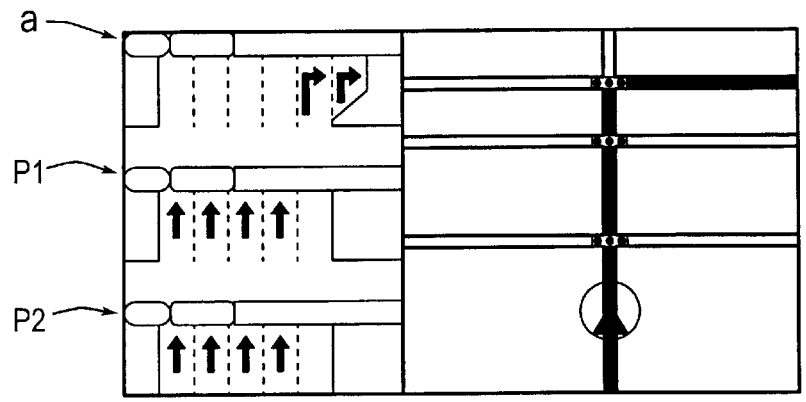
FIGS. 8(A)–8(C) are diagrams showing examples of specific screen executed by a display processing of FIG. 7.
Figure 8B:
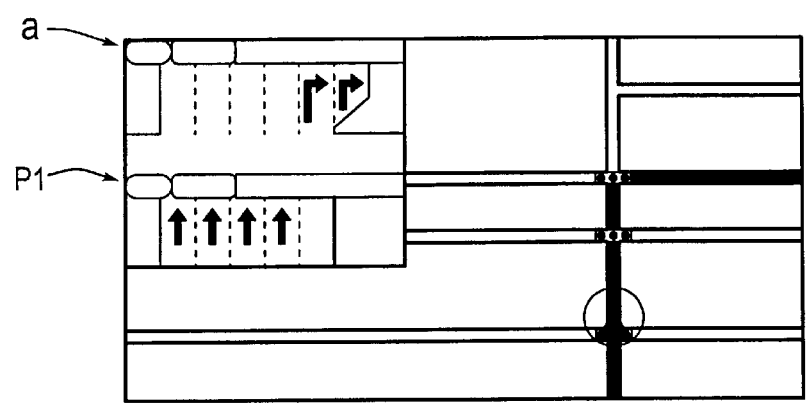
Figure 8C:
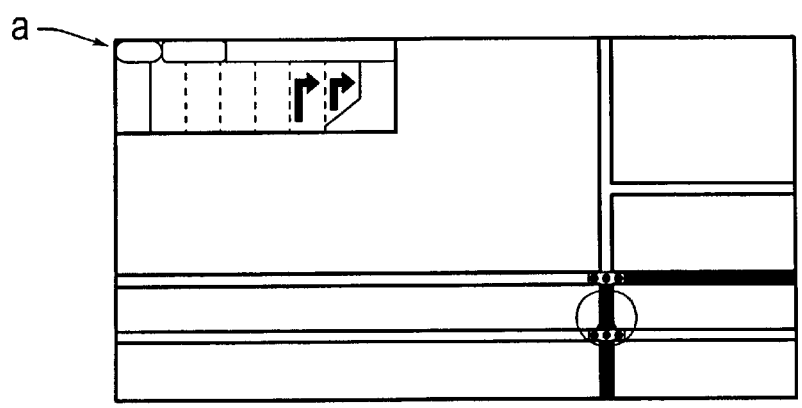

FIGS. 8(A)–8(C) are diagrams showing specific display examples executed by the above display processing. Lane information of 3 points such as the guidance intersection (a) and the passing intersections P1, P2 of FIGS. 6(A)–6(C), intersection names and traffic light marks are displayed on FIG. 8(A), wherein travel direction arrows are indicated on only lanes in which the vehicle can travel. Thereby, a driver can easily determine that the vehicle should not make a lane change to the first lane from the left when passing by the passing intersections P1 and P2, and he can also distinguish at a glance that there are two right turn lanes at the guidance intersection (a). Then, lane information for the passing intersection P2 is deleted as the vehicle passes by the passing intersection P2, shown in FIG. 8(B), further lane information for the passing intersection P1 is deleted when the vehicle passes by the passing intersection P1 shown in FIG. 8(C), and only lane information for the guidance intersection is left on the screen.

Therefore, only the necessary information is shown to the driver, he can understand a number of intersections by which the vehicle passes and a sense of distance to the guidance intersection in real time, moreover, he can travel or a correct route without stress. Further, while the above embodiment is made to display lane information and maps. In addition to this, it may also be made to audibly output directions before the intersection. For example, if "Please do not enter into right lane(s)" is output by a voice when the vehicle is passing by a passing intersection, or if "Please move to the right lane(s)" is output by a voice when making a right turn at a guidance intersection, the driver can travel the correct route without stress.

Another embodiment according to the invention is explained with reference to FIGS. 9–14. The basic display processing of information of a plurality of lanes is described in the embodiment of FIG. 7, however it is described in the below embodiment that processing for determining which of the guidance intersections is given a priority for display if respective guidance intersection (a), (b) and (c) explained in FIGS. 6(A)–6(C) are closely located to each other. In this processing, in which the first priority is given to the guidance intersection (a) in which a right or left turn, to be made the guidance intersections (b) and (c) for traveling in a straight direction are given a lower priority than the guidance intersection (a). If the respective guidance intersections (a), (b) and (c) partly fall on the same guidance display section, whether lane information is displayed, is determined on the basis of the priority.

Figure 9:
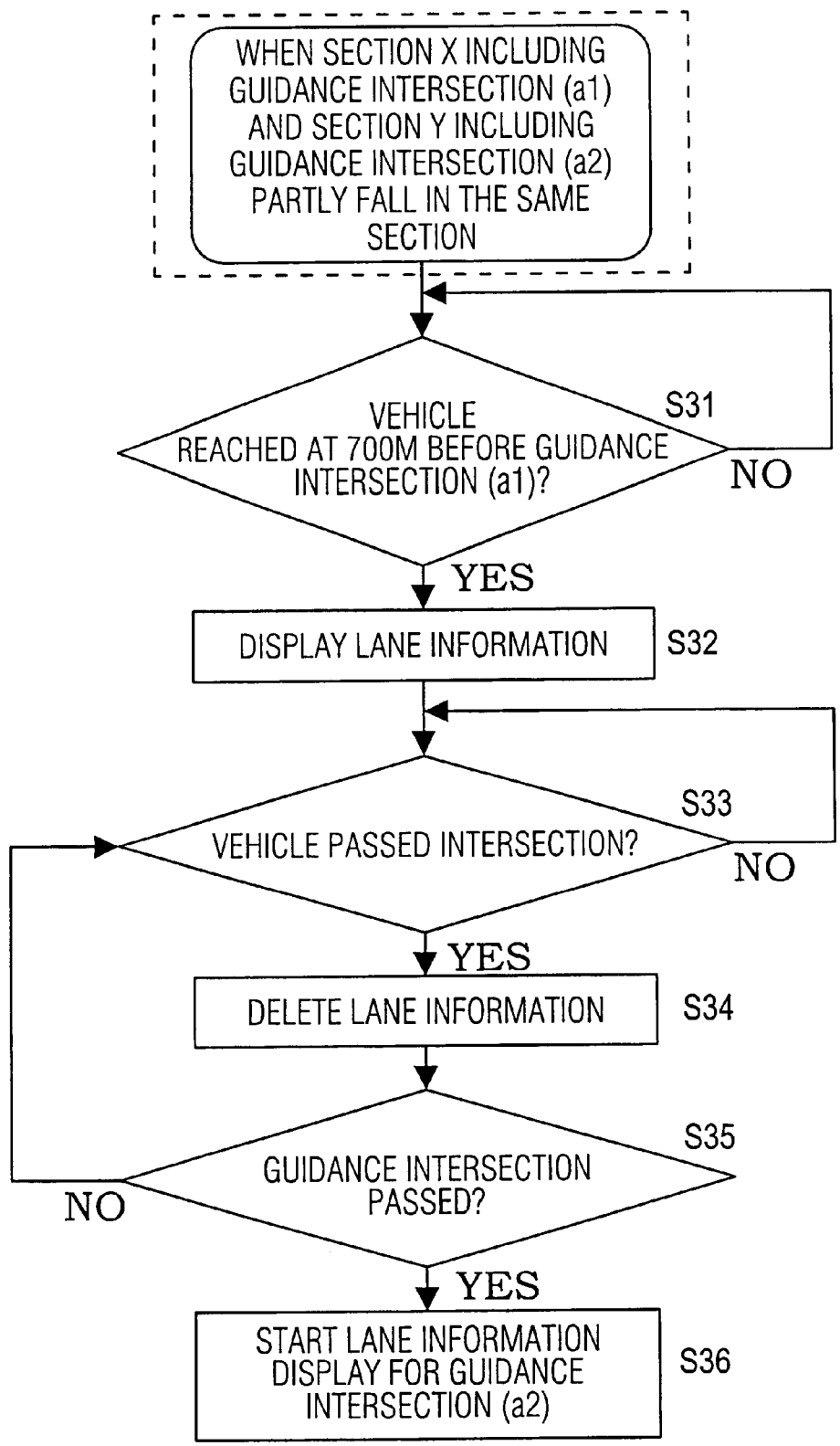
FIG. 9 is a flowchart explaining a display processing of a plurality of lane information according to another embodiment of the invention.
Figure 10:
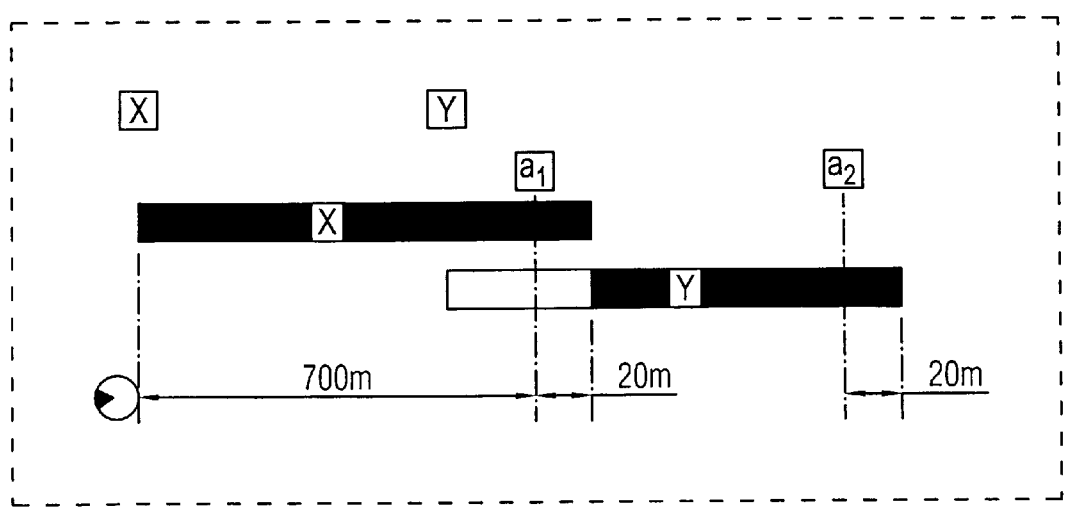
FIG. 10 is a diagram explaining a processing of FIG. 9.

FIGS. 9 and 10 describe another embodiment according to the invention, in which FIG. 9 is a flowchart showing display processing of a plurality of lane information and FIG. 10 is a diagram explaining the processing of FIG. 9. A course of processing S31–S35 is the same as in FIG. 7. The present embodiment describes display processing when it is determined that the guidance intersection (a1) and the guidance intersection (a2) are located closely with each other, as shown in FIG. 10, wherein if a section from the guidance starting point to the guidance intersection (a1)+20 m is designated as the guidance display section X and a section from the guidance starting point to the guidance intersection (a2)+20 m is designated as a guidance display section Y, and the guidance display sections X and Y partly fall on the same section, the closest guidance intersection from the vehicle position is given a priority for guidance under the determination. A display for the guidance intersection (a2) is started at 20 m after the vehicle passed the guidance intersection (a1). Thus, since the guidance intersections (a1) and (a2) are given the same priority, the closest guidance intersection (a1) from the vehicle position is given the first priority for display. Here, a reason for determining the section from the guidance starting point to the guidance intersection +20 m as the guidance display section is simply because it enables the driver to reconfirm the guidance intersection after the vehicle passes. However, it is not limited to 20 m. Further, a section from the guidance starting point to the guidance intersection may be determined as a guidance display section. In this case, guidance for the guidance intersection (a2) is started just after the vehicle passes the guidance intersection (a1).

Figure 11:
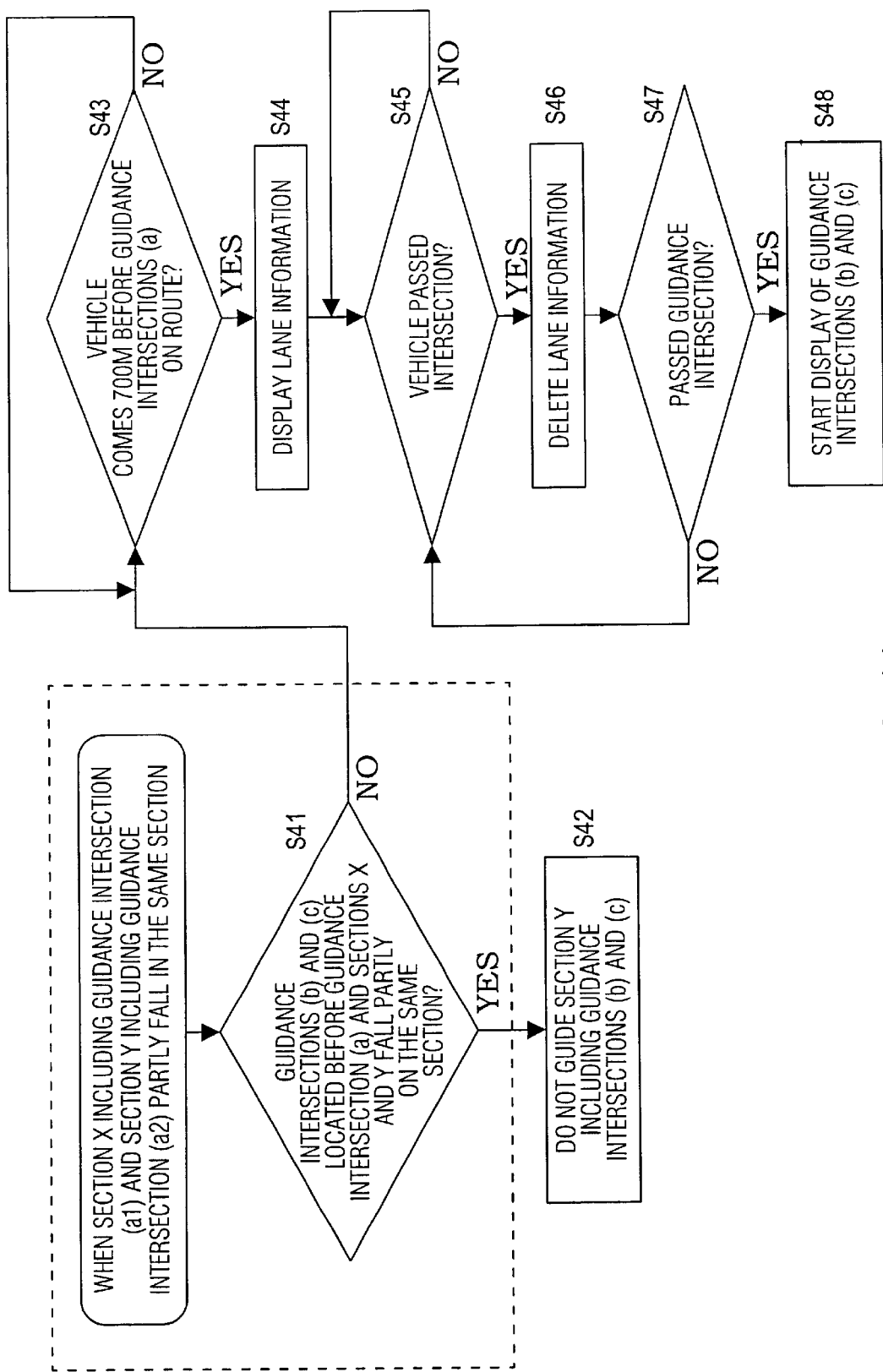
FIG. 11 is a flowchart of a display processing of a plurality of lane information according to another embodiment of the invention.
Figures 12A, 12B:
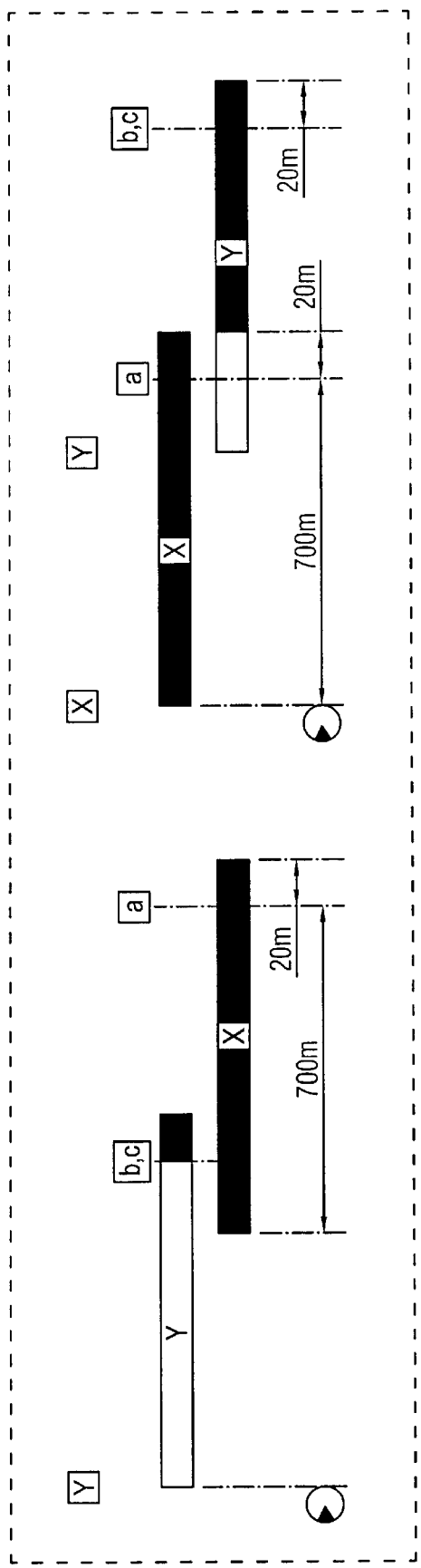
FIGS. 12(A) and 12(B) are diagrams explaining a processing of FIG. 11.

FIGS. 11, 12(A) and 12(B) show another embodiment according to the present invention, in which FIG. 11 is a flowchart showing display processing and FIGS. 12(A) and 12(B) are diagrams explaining a processing of the FIG. 11. The present embodiment is the display processing if it is determined that the guidance intersections (a), (b) or (c) are located close to each other, as shown in FIG. 12, wherein if a section from the guidance starting point to the guidance intersection (a)+20 m is designated as the guidance display section X, and a section from the guidance starting point to the guidance intersection (b) or (c)+20 m is designated as the guidance display section Y, the guidance display sections X and Y are partly fall on the same section in a processing of FIG. 7. Therefore, it is determined whether the guidance intersections (b) and (c) are located before the guidance intersection (a) at step S41. If the guidance intersections (b) and (c) partly fall on the same section, the section Y given the lower priority is not to be displayed at step S42, and a display for the guidance intersection (a) giving the first priority is only executed. (FIG. 12(A)). If not, at step S41, namely, if the guidance intersection (a) is located before the guidance intersections (b) and (c), the same processing as FIG. 7 is executed at steps S43–S47, and if it is determined that the vehicle passed the guidance intersection (a) at step S47, a lane display for the guidance intersection (b) or (c) is started at 20 m after the vehicle passed the guidance intersection (a), at step S48 (FIG. 12(B)).

Figure 13:
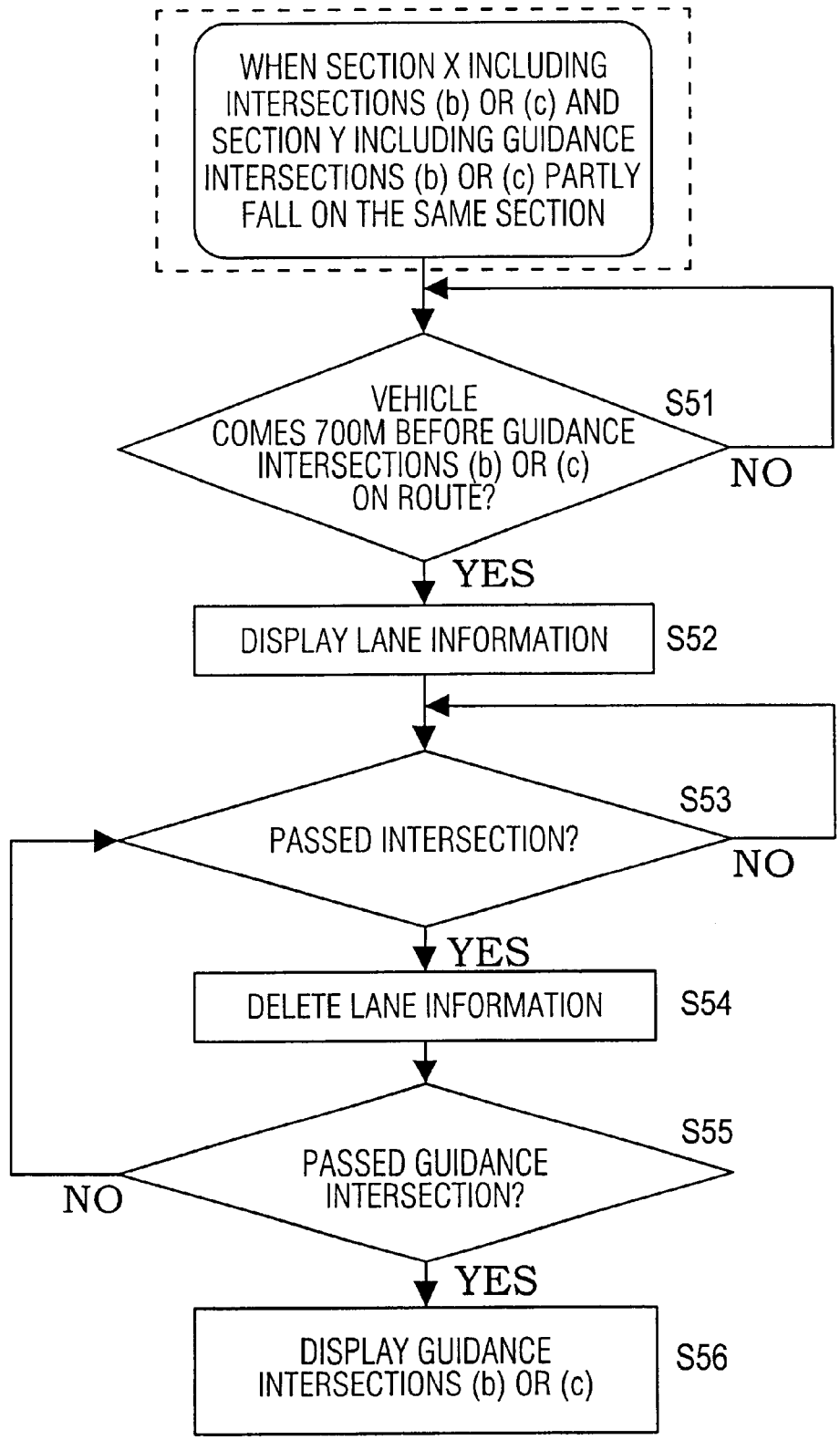
FIG. 13 is a flowchart explaining a display processing of a plurality of lane information according to another embodiment of the invention.
Figure 14:
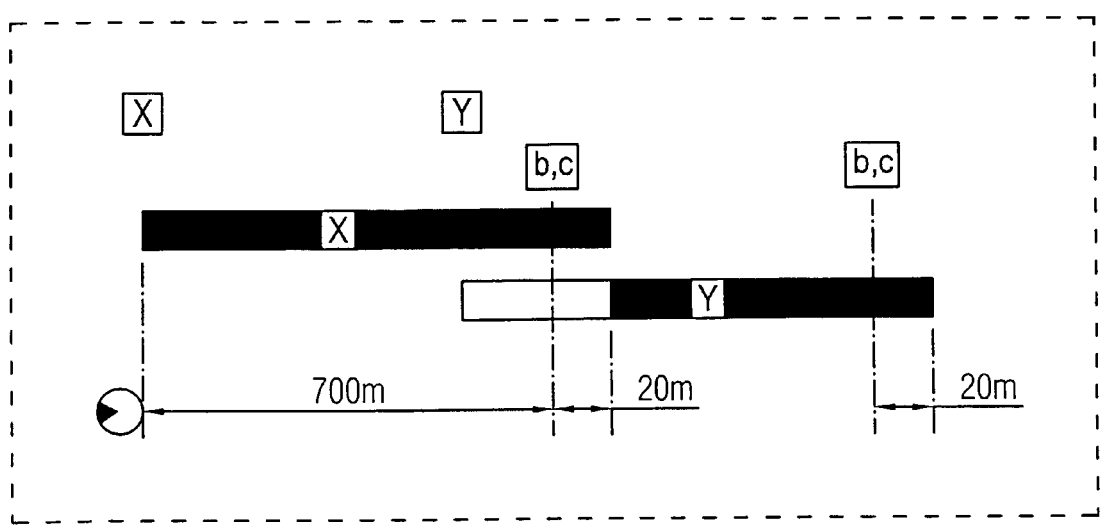
FIG. 14 is a diagram explaining a processing of FIG. 13.

FIGS. 13 and 14 show another embodiment according to the invention, in which, FIG. 13 is a flowchart showing a display processing of a plurality of lane information and FIG. 14 is a diagram explaining processing of FIG. 13. A processing at step S51–S55 in FIG. 13 is the same processing as FIG. 7. The present embodiment is the display processing if it is determined that the guidance intersections (b) or (c) are located close to each other as shown in FIG. 14, and if a section from the guidance starting point to the guidance intersection (b) or (c)+20 m is designated as the guidance display section X, a section from the guidance staring point to the guidance intersection (b) or (c) is designated as the guidance display section Y, the section X for the guidance section (b) or (c) and the section Y for the guidance intersection (b) or (c) partly fall on the same section in the process of FIG. 7. Therefore, a display of the section Y for the guidance intersection (b) or (c) is started at 20 m after the vehicle passes the guidance intersection (b) or (c) at step S56. Thus, since the guidance intersection (d) or (c) is given the same priority, the closest intersection (b) or (c) to the vehicle position is displayed is given the first priority.

Figure 15:
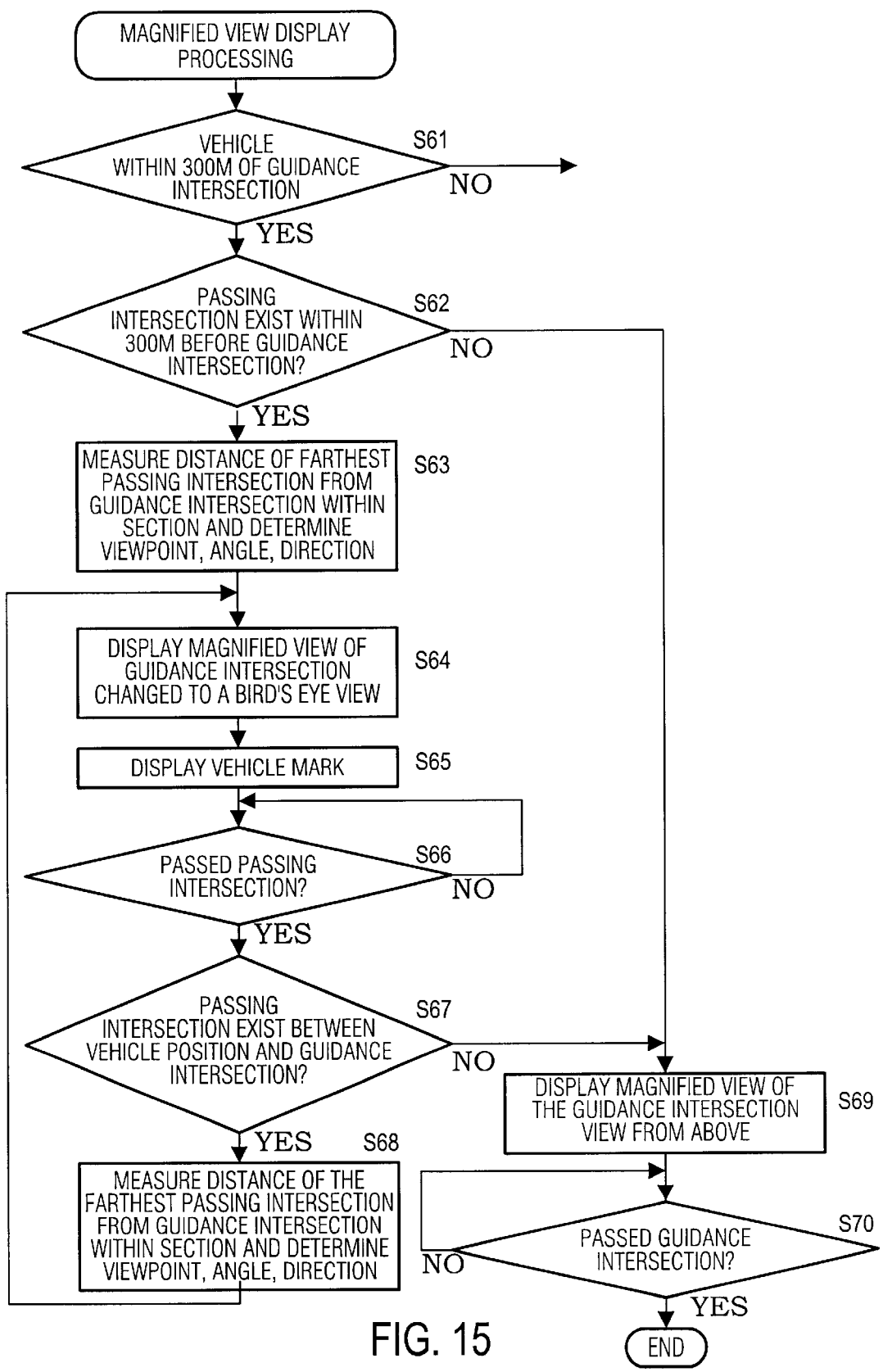
FIG. 15 is a flowchart explaining a magnified view display processing according to another embodiment of the invention.
Figure 16A:
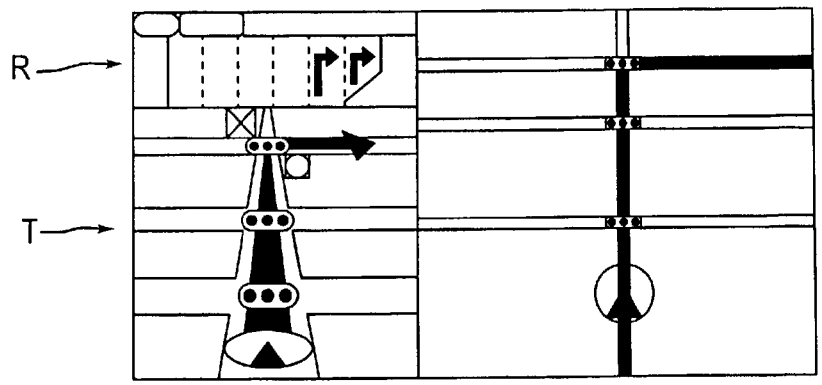
FIGS. 16(A)–16(C) are diagrams explaining examples of screen displayed by FIG. 15.
Figure 16B:
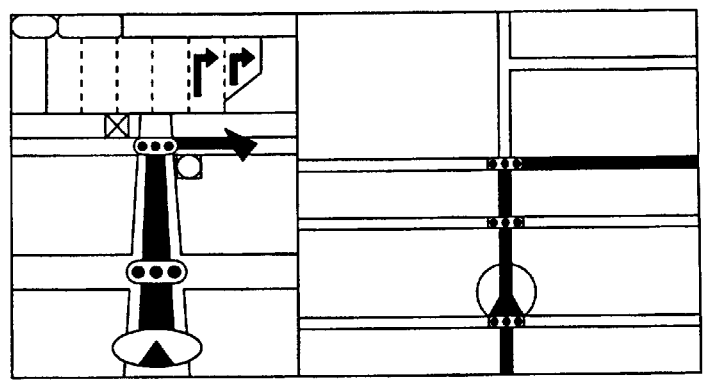
Figure 16C:
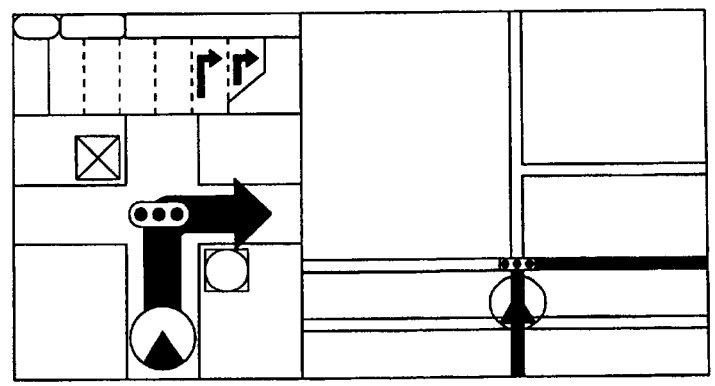

Another embodiment of the present invention is described with reference to FIGS. 15, 16(A), 16(B), and 16(C). FIG. 15 is a flowchart explaining a magnified view display processing, and FIGS. 16(A), 16(B), and 16(C) are diagrams illustrating examples of the display screen which are displayed by the processing of FIG. 15. This embodiment is to display a bird's-eye view T to the guidance intersection in addition to a display of lane information R, as shown in FIG. 16. Thus, this invention may include a drawing device to determine a viewpoint, an overlook angle and a direction according to a distance between a guidance intersection and a passing intersection, and to draw a bird's-eye view.

In route guidance of the navigation system, in general, a magnified view of the guidance intersection is displayed when the vehicle reaches approximately 300 m before the guidance intersection. In this case, what is to be displayed on a screen is, due to the limitation on space, a guidance intersection map of approximately 150 m on all sides, in which a vehicle mark in the magnified map is moved along the guidance route from when the vehicle reaches 150 m before the intersection. Therefore, the state of a section between 300 m and 150 m is not displayed so that if a passing intersection is located within the section, it may cause the vehicle to deviate from the route since such an intersection is determined as a guidance intersection. Further, the vehicle mark does not move on the route within the section, therefore, the only thing the driver can do is to rely on voice guidance and guidance on the remaining distance indicator. Thus, it gives the driver a gap in the sense of distance to the intersection at which the vehicle has to actually make a turn.

In the present embodiment, a bird's eye view which is looking down on the guidance intersection from the upper side by moving the viewpoint to the upper side, is used in order to display accurately a widened route to the guidance intersection, and the view point is moved each time the vehicle passes a passing intersection within the section. Then, only necessary information is displayed, and additional guidance is performed by synchronizing a voice.

In FIG. 15, first of all, it is determined whether the vehicle reaches the predetermined distance to the guidance intersection, for example, 300 m before (step S61). If the vehicle reaches 300 m before, then it is determined whether a passing intersection(s) exists within the section 300 m before the guidance intersection (step S62). If a passing intersection(s) exits, a distance to the farthest passing intersection from the guidance intersection within the section is measured, the bird's eye viewpoint is determined on the above just before the passing intersection is determined, further map data including the passing intersection and guidance intersection, a looking down angle and direction are determined, at S63 then a magnified view of the guidance intersection which was changed to the bird's eye view is displayed (step S64), a vehicle mark is displayed on the magnified view and a movement of the vehicle mark is started (FIG. 16(A)). Next, it is determined whether the vehicle passes the passing intersection at step S66. If yes, it is then determined whether a passing intersection(s) exists between the vehicle position and the guidance intersection at step S67. If yes, the farthest passing intersection from the guidance intersection is measured, then the bird's eye viewpoint is moved to the above just before the corresponding passing intersection, a looking down angle and direction thereof are determined, at step S68 then the processing goes back to S64 again and the magnified view of the guidance intersection which was changed to the bird's eye view, is displayed (FIG. 16(B)). Therefore, intersections which the vehicle passes are not displayed in the magnified view of the guidance intersection. The same as above, the processing S64–S68 is repeated every time the vehicle passes a passing intersection. If it is determined that there is no passing intersection between the vehicle position and guidance intersection at steps S62 and S67, then moving onto step S69, then the magnified view of the guidance intersection which is viewed just above the guidance is displayed (FIG. 16(C)), next it is determined whether the vehicle passes the guidance intersection (step S70), and a course of the processing is completed if the vehicle has passed the guidance intersection.

As above, according to the present embodiments, since a vehicle mark starts to move on the guidance route at 300 m before the guidance intersection and further a of bird's eye viewpoint is changed every time the vehicle passes a passing intersection, only information necessary can be transmitted to the driver. Thus, the above guidance is added to lane information and guidance with the remaining distance display. As a result, the driver no loner feels the gap in the sense of distance between the vehicle position and the guidance intersection, the guidance intersection can be distinguished more easily.

The embodiments according to the present invention are described, however, the present invention is not limited to herein, and that various changes can be made. For example, according to the above embodiment, lane information, as shown in FIG. 3, is made on the basis of lane information data, however lane information may be patternized and a corresponding pattern may be read out when the vehicle comes close to the guidance intersection.

Further, according to the above embodiment, it is made to display the guidance intersection and the passing intersection together when the vehicle comes close to the predetermined distance before the guidance intersection, however these may be displayed by option. For example, if guidance intersections are displayed in order, so as to let the drive confirm a route to the destination before traveling, the driver can confirm lanes to which he should pay his attention on the way to the destination by displaying guidance information of both the guidance intersection and the passing intersection together.

What is claimed is:

1. A navigation system that searches a route according to an input of a point such as a destination and performs route guidance along the searched route, the navigation system comprising:

an information memory device that stores lane information data of intersections;

a display that displays the lane information; and a display controller that controls the display of lane information of intersections on the basis of lane information data stored in the information memory device, wherein the display controller determines whether passing intersections exist within a predetermined distance before a guidance intersection, and controls the display of lane information of the guidance intersection and the passing intersections if the passing intersections exist.

2. The navigation system according to claim 1, wherein if guidance display sections for a plurality of guidance intersections fall into the same section, the display controller determines that lane information is displayed on the basis of a priority given to the plurality of guidance intersections.

3. The navigation system according to claim 1, further comprising a drawing unit for drawing a bird's eye view by changing a viewpoint, wherein the display controller changes the bird's eye viewpoint every time the vehicle passes a passing intersection if the passing intersections exists from the vehicle present position to the guidance intersection.

4. The navigation system according to claim 1, further comprising a present position detector that detects information regarding a vehicle's present position, wherein the display controller determines whether the passing intersections exist from the vehicle's present position to the guidance intersection when the vehicle's present position approaches the predetermined distance to the guidance intersection.

5. The navigation system according to claim 4, wherein the display controller deletes the lane information of the passing intersection when the vehicle present position passes the passing intersection.

6. The navigation system according to claim 1, wherein the lane information includes a number of access lanes to the intersection, a number of departure lanes from the intersection and travel lane information of each lane.

7. The navigation system according to claim 6, wherein the display controller controls the display such that that travel direction arrows are displayed only on lanes in which the vehicle is permitted to travel.

8. A storage medium for storing programs of a navigation system that performs route guidance according to an input of a point, such as a destination, comprising:

a program for storing lane information data of intersections in an information memory device;

a program for displaying the lane information; and a program for controlling the display of lane information of intersections on the basis of lane information data stored in the information memory device, wherein the program for controlling determines whether passing intersections exist within a predetermined distance before a guidance intersection, and controls the display of lane information of the guidance intersection and the passing intersections if the passing intersections exist.

9. The storage medium according to claim 8, further comprising a program for drawing a bird's eye view by changing a viewpoint, wherein the program for controlling changes the bird's eye viewpoint every time the vehicle passes a passing intersection if the passing intersections exists from the vehicle present position to the guidance intersection.

10. The storage medium according to claim 8, wherein if guidance display sections for a plurality of guidance intersections fall into the same section, the program for controlling determines that lane information is displayed on the basis of a priority given to the plurality of guidance intersections.

11. The storage medium according to claim 8, further comprising a program for detecting a vehicle's present position, wherein the program for controlling determines whether the passing intersections exist from the vehicle's present position to the guidance intersection when the vehicle's present position approaches the predetermined distance to the guidance intersection.

12. The storage medium according to claim 11, wherein the program for controlling deletes the lane information of the passing intersection when the vehicle present position passes the passing intersection.

13. The storage medium according to claim 8, wherein the lane information includes a number of access lanes to the intersection, a number of departure lanes from the intersection and travel lane information of each lane.

14. The storage medium according to claim 13, wherein the program for controlling controls the display such that that travel direction arrows are displayed only on lanes in which the vehicle is permitted to travel.

15. A method for performing route guidance for a navigation system that according to an input of a point, such as a destination, comprising:

storing lane information data of intersections in an information memory device;

displaying the lane information; and controlling the display of lane information of intersections on the basis of lane information data stored in the information memory device, wherein the controlling step determines whether passing intersections exist within a predetermined distance before a guidance intersection, and controls the display of lane information of the guidance intersection and the passing intersections if the passing intersections exist.

16. The method according to claim 15, wherein if guidance display sections for a plurality of guidance intersections fall into the same section, the controlling step determines that lane information is displayed on the basis of a priority given to the plurality of guidance intersections.

17. The method according to claim 15, further comprising drawing a bird's eye view by changing a viewpoint, wherein the controlling step changes the bird's eye viewpoint every time the vehicle passes a passing intersection if the passing intersections exists from the vehicle present position to the guidance intersection.

18. The method according to claim 15, further comprising detecting a vehicle's present position, wherein the controlling step determines whether the passing intersections exist from the vehicle's present position to the guidance intersection when the vehicle's present position approaches the predetermined distance to the guidance intersection.

19. The method according to claim 18, wherein the controlling step deletes the lane information of the passing intersection when the vehicle present position passes the passing intersection.

20. The method according to claim 15, wherein the lane information includes a number of access lanes to the intersection, a number of departure lanes from the intersection and travel lane information of each lane.

21. The method according to claim 20, wherein the controlling step controls the display such that that travel direction arrows are displayed only on lanes in which the vehicle is permitted to travel.

* * * * *